United States Patent [19]
Calhoun

[11] Patent Number: 5,979,635
[45] Date of Patent: Nov. 9, 1999

[54] CONTAINER DIVERTER APPARATUS AND METHOD

[75] Inventor: Fred L. Calhoun, Rolling Hills Estate, Calif.

[73] Assignee: Industrial Dynamics Co., Ltd., Torrance, Calif.

[21] Appl. No.: 08/956,146

[22] Filed: Oct. 22, 1997

[51] Int. Cl.$^6$ ............................ B65G 47/26; B65G 37/00; B65G 43/00
[52] U.S. Cl. ..................... 198/456; 198/349.5; 198/444
[58] Field of Search ..................... 198/437, 456, 198/440, 436, 367, 625, 431, 448, 467.1, 419.2, 426, 349.5, 444, 348, 340

[56] References Cited

U.S. PATENT DOCUMENTS

| | | | |
|---|---|---|---|
| 4,474,295 | 10/1984 | Braschos | 198/436 X |
| 4,501,365 | 2/1985 | Peyton et al. | |
| 4,779,715 | 10/1988 | Pazdernik | 198/436 |
| 5,115,902 | 5/1992 | Snyder et al. | 198/440 |
| 5,423,409 | 6/1995 | Wipf | 198/367 |

Primary Examiner—William E. Terrell
Assistant Examiner—Kenneth W. Bower
Attorney, Agent, or Firm—Irving Keschner

[57] ABSTRACT

Container diverter apparatus and method for displacement of selected containers on a conveyer for such purposes as rejection, sorting and the like. In accordance with the invention, a servo controlled actuator is positioned adjacent to the stream of containers on the conveyer, so as to be able to push selected containers to a different position across the width of the conveyer. The servo controlled actuator is controlled by a commanded position waveform, which may be tailored to the containers being deflected and which may be readily changed for different containers by use of a look-up table. Detection of the precise initial position of each container on the conveyer allows initial servoing of the actuator to a predetermined distance from the container prior to initiation of the ejection waveform, resulting in fast and precise displacement of selected containers in a highly reliable and very repeatable manner. Various embodiments are disclosed.

14 Claims, 5 Drawing Sheets

CONTAINER DIVERTER APPARATUS AND METHOD

BACKGROUND OF THE INVENTION

1. Field of the Invention

The present invention relates to the field of container handling apparatus, and in a preferred embodiment to empty and full container handling apparatus as used in the food and beverage industries.

2. Prior Art

The preferred embodiments of the present invention are intended for use in the food and beverage industries for changing position, across the width of a conveyer, of selected containers for such purposes as separating containers which are somehow unsatisfactory from the main line, sorting of containers and the like. Accordingly, only the prior art relating to the food and beverage industry will be discussed herein. Further, the word "container" as used herein is used in a very general sense, whereas the words "bottles" and "cans" are each used in their more natural limiting sense, the latter being used to provide greater specificity to the description of preferred embodiment of the invention. It should be noted however, that the description of the preferred embodiments with respect to bottles and cans is in general directly applicable to containers of substantially all kinds.

In the beverage industry, particularly the soft drink and beer industries, large quantities of empty cans and glass and plastic bottles proceed along a conveyor system through processing steps to obtain properly filled, sealed and labeled product ready for shipment. In this equipment, conveyor speeds on the order of 1000 to 2000 containers per minute are common. By their nature, automatic inspection functions at various positions along this processing line must have associated therewith some method and apparatus for automatically diverting unacceptable containers from the main conveyor line as required.

One general type of container diverter system which has been used in the prior art, and is of the general type used in the present invention, is a system wherein the containers proceed typically adjacent one side of a relatively wide conveyor. Selected containers which are to be diverted are then momentarily contacted from the side to push the same to the other side of the conveyor, the undiverted containers proceeding onto a first outflow conveyor and the diverted containers proceeding to a second outflow conveyor.

One type of actuator which has been used with such systems has been a simple pneumatic actuator, triggered at the appropriate time in a bang-bang fashion to divert selected containers without in any way interfering with the travel of either the prior or the next container, unless of course that one is to be diverted also. Such a diverter is functional, though has certain disadvantages. Because it is preferable to have the diverter reasonably close to the container before it is fired, and typically lines run containers of different size at different times, conversion of the line to a different size container normally requires physical readjustment of the location of the actuator as well as the changing of the spacing of the fences defining the container path to the diverter. Further, adjustments of air pressure, etc. may also be required to accommodate filled containers of different sizes, which thus have different weights. Also, if the container is to be diverted because a prior inspection machine determined it had no cap or seal, the violence of the bang-bang type operation will usually cause spillage of some of the contents, making a mess on the conveyor system. Because such diverters can tend to stick, they must be driven fairly hard, as a minimum, to be sure they will reliably operate.

Also, container diverting systems using compressed air actuators, particularly at high speed, have some tendency to cause a container, particularly a beverage bottle, to turn over, which will let the container roll to undesirable positions across the conveyor, perhaps jam on the fence dividing the two outfeed conveyors, or cause other problems downstream in the equipment if the container successfully negotiates the intended outfeed conveyor.

Another type of diverter currently in use has a series of fingers of different lengths arranged along the conveyor so that the fingers may be extended into the path of a container on the conveyor to define a sort of inclined plane to divert the container to the other side of the conveyor. Since if all fingers were extended at the time, the fingers would span considerably more than the diameter of one container, the fingers must be extended and retracted in a sort of sequential manner so as to not interfere with the possible free travel of adjacent containers, on the assumption that the adjacent containers are likely not intended to be diverted. This system, too, is functional, though is mechanically complex and can require excessive maintenance. Also, actual systems of this type have only partially diverted containers from the main line, depending upon the velocity obtained during that partial diversion to carry a container the rest of the way across the conveyor. This, of course, makes the diversion conveyor-speed dependent, an undesirable characteristic, and because of only a partial positive diversion, will not satisfactorily operate down to zero conveyor speed as required during start up and shut down of the line for maintenance, to clear a problem or for container size change over.

Another container diverter system is disclosed in U.S. Pat. No. 4,501,365. This system is somewhat similar to the foregoing in that the positive part of the container diversion occurs over a longer time than the time of passage of a single container. The same has the further advantage of being able to provide positive diversion for the full container diversion distance desired. However, it too is complex and requires considerable additional space to accommodate the mechanism required.

SUMMARY OF THE INVENTION

Container diverter apparatus and method for displacement of selected containers on a conveyor for such purposes as rejection, sorting and the like. In accordance with the invention, a servo controlled actuator is positioned adjacent to the stream of containers on the conveyor, so as to be able to push selected containers to a different position across the width of the conveyor. The servo controlled actuator is controlled by a commanded position waveform, which may be tailored to the containers being deflected and which may be readily changed for different containers by use of a look-up table. Preferably this commanded position wave form has a substantially constant slope defining the extension waveform, resulting in a substantially constant velocity diverter motion. Also, because of the servo control, one is assured that the actuator will not stick, so that the velocity may be controlled to be less than might be reliably obtained with a simple bang-bang air actuated diverter.

Use of the constant velocity diverter, particularly with a lower velocity than typical of the prior art, diminishes the effect of variations in the initial spacing between the container to be diverted and the diverter itself, reducing impact on the container and minimizing the opportunity for the container to fall over. If desired, the precise initial position of each container on the conveyor can be detected, which can allow initial servoing of the actuator to a predetermined distance from the container prior to initiation of the ejection waveform. The ability to define the starting point and to tailor the commanded position waveform allows use of more than one commanded waveform for particular containers, allowing selectively controlled extent of diversion of containers. This allows possible use of the invention in sorting rejected containers at the time of rejection, such as, by way of example, diverting containers without tops to a first outfeed conveyor, containers without labels to a second outfeed conveyor and containers having an inadequate fill level to a third outfeed conveyor.

Various other embodiments are disclosed.

DETAILED DESCRIPTION OF THE INVENTION

Figure 1:
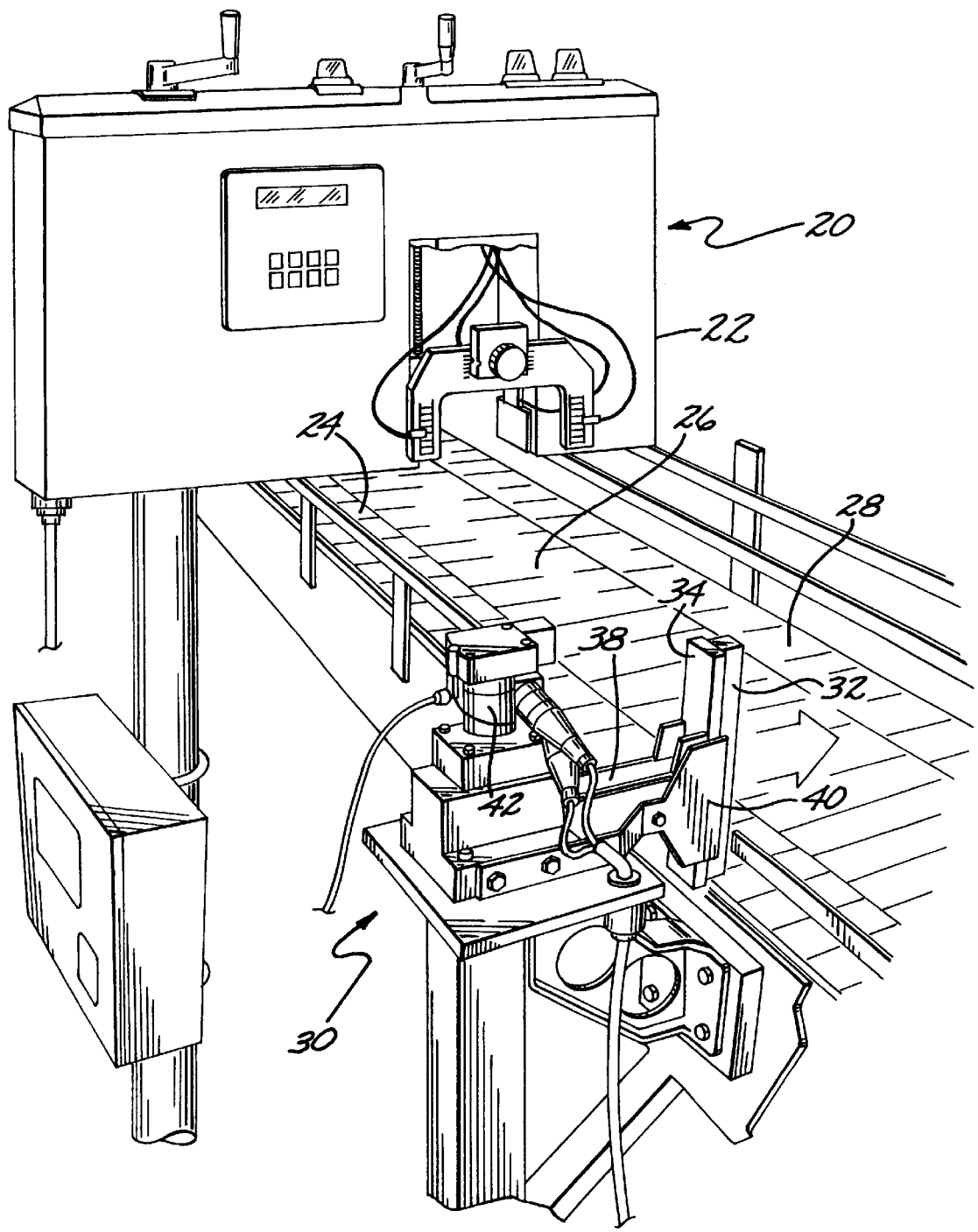
FIG. 1 is a perspective view of the present invention as used as a diverter for a prior art inspection system.

First referring to FIG. 1, a perspective view of the present invention as used as a diverter for a prior art inspection system may be seen. The inspection system used in the illustrative embodiment, generally indicated by the numeral 20, is a Filtec FT-50 Inspection System, manufactured by Industrial Dynamics Company, Ltd., assignee of the present invention. This inspection system has an inspection head 22 through which the containers to be inspected will pass as carried on an in-feed conveyor 24. Containers which pass the inspection will continue on the in-feed conveyor 24 down to the next container processing. However, containers which for some reason do not pass the automatic inspection are diverted across a central conveyor 26 to a rejected container conveyor 28 for reprocessing or disposal. The Filtec FT-50 Inspection System will automatically inspect for such things as container fill level, various types of cap inspection (missing cap, cocked or high cap), bulged can, low foam condition in glass containers, cans which have fallen over, missing labels, etc. These aspects of the inspection system are well known and need not be described further herein.

In accordance with the present invention, a diverter, generally indicated by the numeral 30, is positioned adjacent to in-feed conveyor 24 and contains a pusher bar 32 which may be extended a short distance to divert bottles from their normal path along the in-feed conveyor 24 with sufficient speed so that the same will slide across the intermediate conveyor 26 to the reject conveyor 28.

Figure 2:
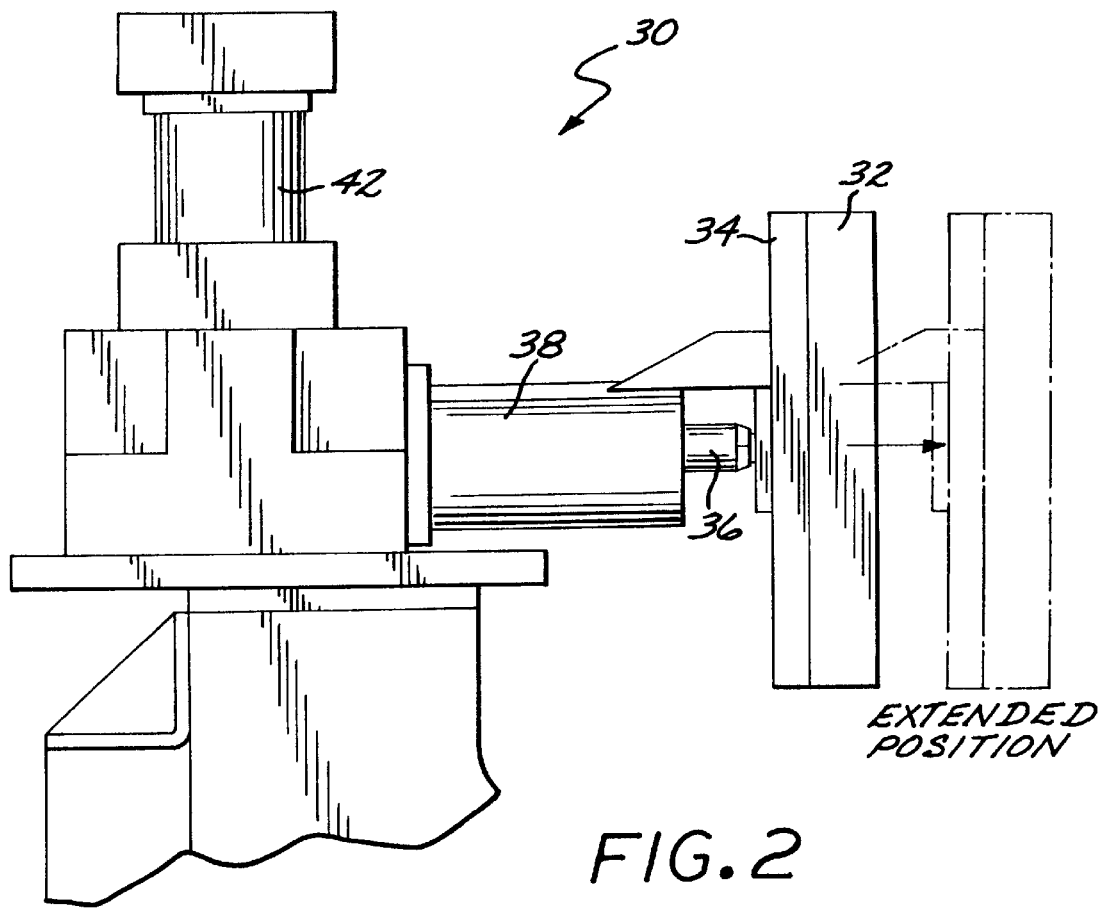
FIG. 2 is a schematic side view of the diverter of FIG. 1.

Details of the diverter may be seen both in the perspective view of FIG. 1 and in the schematic side view of FIG. 2. The pusher bar 32 is preferably a reasonably firm elastic member to cushion its initial contact with the container, yet capable of rapidly diverting the container from its current path without significant deflection. The pusher bar is supported in a metal channel member 34, in turn fastened rigidly to actuator bar 36 (see FIG. 2) on a pneumatic actuator generally located within housing 38. Located within housing 38 is a linear variable differential transformer (LVDT) having the moving member thereof coupled to actuator bar 36 so that the output of the LVDT is an accurate measure of the actual position of the actuator bar 36, and thus of the pusher bar 32. Adjacent the side of member 34 is a fixed plate 40 which maintains pusher bar 32 and its support member 34 vertical to prevent the same, together with the actuator bar 36 (FIG. 2), from rotating about a horizontal axis. Also, the diverter assembly includes a control valve 42 which controls the supply of high pressure air to and from the actuator.

Figure 3:
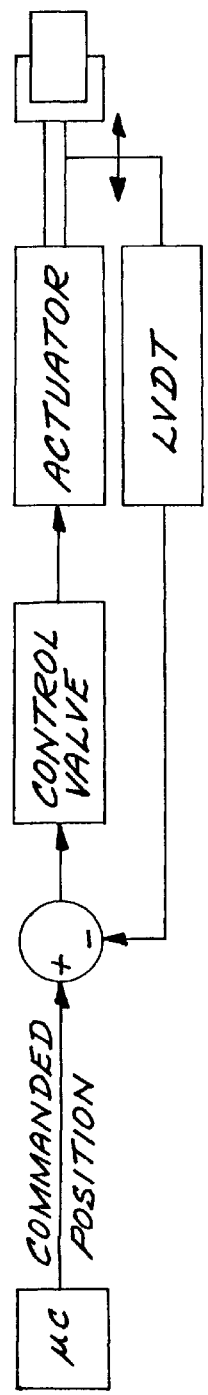
FIG. 3 is a block diagram showing the cooperation of the various elements of the diverter system to form a servo controlled diverter.

The cooperation of the various elements of the diverter system, forming a servo controlled diverter, may be seen in FIG. 3. The commanded position is a signal received from a microcontroller subsequently described, which is combined with the output of the linear variable differential transformer (LVDT) to provide an error signal to the control valve controlling high pressure air to the actuator. In this manner, a proportional control actuator is achieved with minimum error between the commanded position and the actual position of the actuator as measured by the LVDT. In that regard, there will of course be some dynamic response of the system, resulting in some deviation of the actual actuator motion in comparison to the commanded position, though these lags and overshoots are in general held to a minimum by the fast time response of the system and by providing good stability for the closed loop using techniques will known in the art. In that regard, one of the advantages of the present invention is the fact that high pressure air such as 150 psi air may be used to power the control valve, independent of the size of the containers being diverted or the desired velocity of the diversion, as the force on the container imposed by the diverter is determined not by the operating air pressure, but rather by the commanded position profile with time (preferably a substantially constant velocity commanded position). Consequently, no adjustments need to be made to a supply pressure regulator when changing from one container size to another. This is to be compared to the prior art, wherein the force on the containers was directly proportional to the air pressure supplied to the actuator, requiring manual adjustment of a mechanical regulator to convert the line from one container size to another container size.

Figure 4:
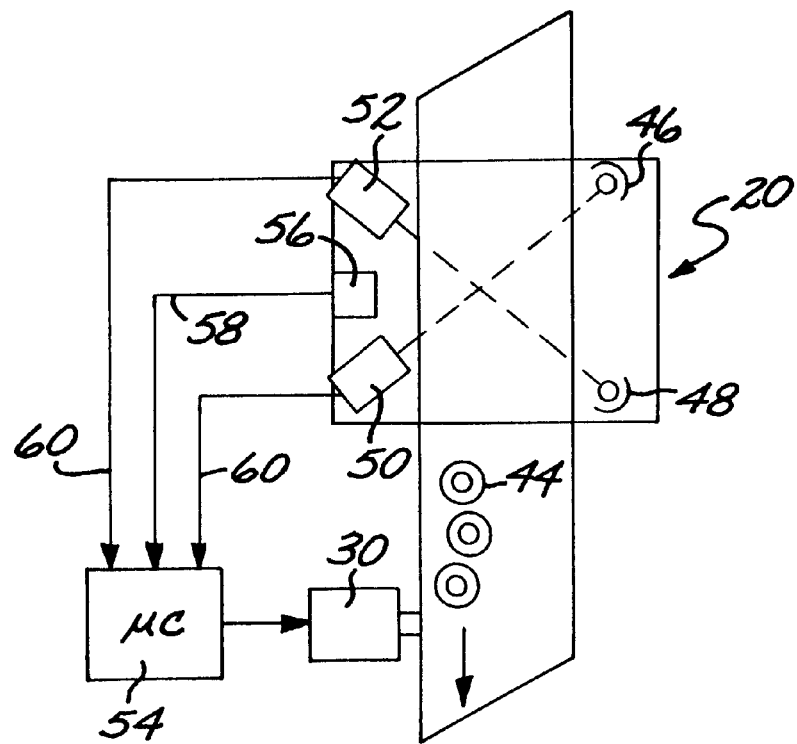
FIG. 4 is a diagram illustrating one embodiment for the control of the diverter system of the present invention.

Now referring to FIG. 4, one embodiment for the control of diverter 30 may be seen. Here a few bottles 44 are shown on the conveyor system. However in general the bottles or other containers will be substantially back-to-back in single file on the conveyor, though typically not in a perfectly straight line because of some vibration induced wandering of the containers from the ideal straight line, prior crowding etc. In any event, in this embodiment the containers are sensed by a combination of light sources 46 and 48 and light sensors 50 and 52. This embodiment is particularly suited for the sensing of filled plastic and glass bottles by detecting the passage of the neck of the bottle, as typically containers on the conveyor are too close together to detect cylindrical containers or the wider part of non-cylindrical containers. In any event, the light sources and light sensors as shown in FIG. 4 indicate the time each light beam is broken by the start of passage of the relevant portion of the container, or alternatively each time the light beam is reestablished between the respective light source and light sensor after passage of the relevant portion of the container. If light sensors 50 and 42 sense the passage of a container at the same time, then the center line of the container will pass through the point at which the light beams cross. If, on the other hand, light sensor 52 detects the passage of a container before light beam 50, the same indicates that the container is to the left (referenced to FIG. 4) of the point of crossing of the light beams in an amount proportional to the product of the conveyor velocity and the time between sensing of the container by light sensor 52 and light sensor 50. Similarly, if light sensor 50 senses the passage of the container prior to light sensor 52, the container is to the right of the point on the conveyor where the beams cross, again by an amount proportional to the product of the time between sensing and the conveyor velocity. In any case, the container will be at the same fixed position along the conveyor, regardless of its sidewise position on the conveyor at a time midway between the time the first and second light sensors sense the passage of the container. Thus, the microcontroller 54 monitors both the position of each container along the conveyor and its lateral position across the conveyor.

In the prior art inspection system, information from the individual inspection is analyzed to make an accept/reject decision. This system also operates under microprocessor control and further monitors the conveyor speed so that once the reject decision had been made for an individual container, the signal actuating the solenoid valve controlling the diverter can be delayed until the rejected container is in the proper position relative to the diverter. In the present invention, preferably the inspection system processor, schematically represented as element 56 in FIG. 4, provides the accept/reject information to the microcontroller 54 at the time of the inspection, and further provides continual information on the conveyor speed, such information being provided to the microcontroller 54 on line or lines 58. Alternatively, information on the conveyor velocity could be provided to the microcontroller 54 from separate conveyor velocity sensors, if desired, depending upon how the system is configured. In any event, microcontroller 54 also receives the information from light sensors 50 and 52 on lines 60, from which the container position along and across the conveyor can also be determined.

Figure 6:
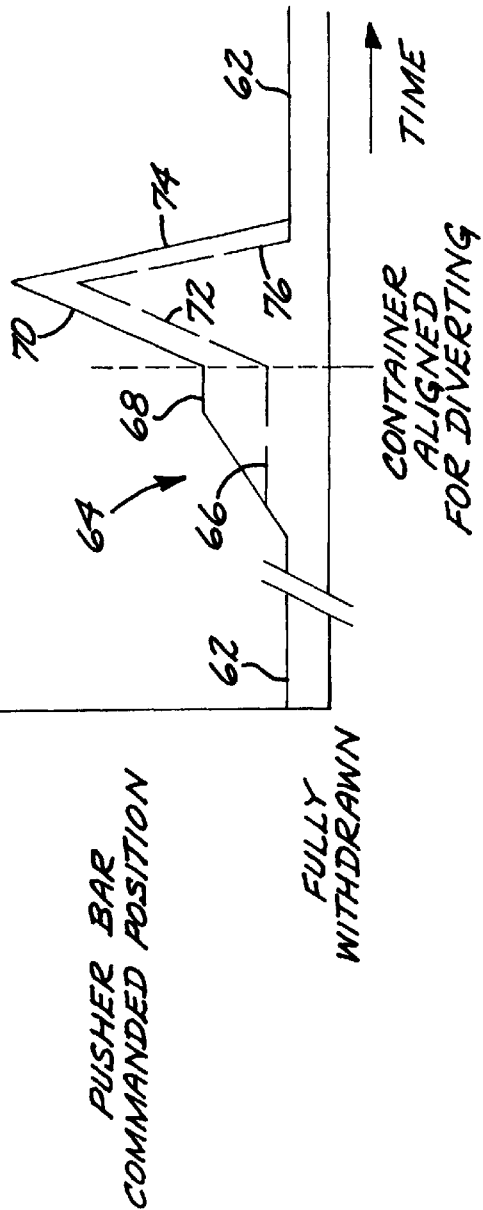
FIG. 6 illustrates exemplary commanded position profiles that could be provided by the microcontroller 54 to the servo controlled diverter.

As previously described, the diverter of the present invention is a servoed diverter, in the preferred embodiment a servoed diverter using an air actuator and a LVDT feedback device, to be responsive to a commanded position provided thereto by the microcontroller 54. Typical commanded position profiles that could be provided by the microcontroller 54 are shown in FIG. 6. As shown therein, for a particular container in this embodiment, the pusher bar is normally withdrawn to a position 62, which will allow any containers not rejected to freely pass thereby. Preferably, this withdrawn position is still within the proportional range of the servo controller actuator, so that the same is immediately ready to respond to subsequent commands. Then, as a rejected container approaches the diverter, the actuator is commanded to extend until the pusher bar will be adjacent to the container to be rejected. This extension of the actuator, shown as region 64 of FIG. 6, is controlled to allow the pusher bar to extend in a manner to avoid contact with the immediately preceding container (on the assumption that the same is itself not being rejected), and preferably to pause at a position which will be immediately adjacent to the container when the container is to be actually diverted.

By way of example, in FIG. 6 the pusher bar may be extended slightly to position 66 for containers which have wandered somewhat toward the diverter, or further extended to a position such as position 68 for containers which are further out on the conveyor. In a preferred embodiment, it has been found desirable to extend the pusher bar to within approximately 0.040 inches of the container before initiating the actual diversion of the container. In any event, when the container is appropriately aligned with the diverter, the pusher bar will be commanded to extend from its initial position adjacent to the container to accelerate the container in a lateral direction to allow the same to slide to the opposite side of the conveyor. In that regard, note that the amount of extension 70 and 72 during the diversion process is preferably the same independent of the starting point, though the total extension of the diverter is less for container initially closer to the diverter. In any event, normally the diverter extension will be substantially less than the total amount of lateral container travel desired, depending on the momentum of the container to carry the same to the opposite side of the conveyor. Also, the linear position profiles will provide a substantially constant velocity extension, so that a fixed diverter stopping point can be used if desired, as the container velocity achieved will be substantially the same regardless of the diverter's starting point. (A nonlinear velocity profile may be used if desired.) After extension of the diverter, the same will be retracted (74 and 76 of FIG. 6) to position 62, awaiting the next container to be rejected. Preferably this retraction will be as rapid as reasonably possible, as the immediately following container may on occasion itself need to be rejected. In that regard, in the event two containers in a row are to be rejected, the retraction of the pusher bar after rejecting the first container may be all the way back to position 62 of FIG. 6 from which a second diverter operation is initiated, or alternatively back to a position such as position 66 or 68, depending on the lateral position of the next container, so as to be more immediately in readiness for rejection of the next successive container.

FIG. 6 of course is merely representative of one form of commanded diverter position, the actual diverter position varying from the form shown to some extent because of the dynamics of the servo loop of FIG. 3. However, other commanded position profiles may also be used. By way of example, pausing at positions such as positions 66 and 68 could be eliminated if desired. Further, the diverter could be constantly servoed so as to allow each container to pass a fixed (small) distance therefrom, independent of the container's position on the conveyor. This has the advantage of providing a visible indication that the sensing system is working properly, though results in unnecessary and perhaps excessive wear in the diverter system.

Figure 8A:
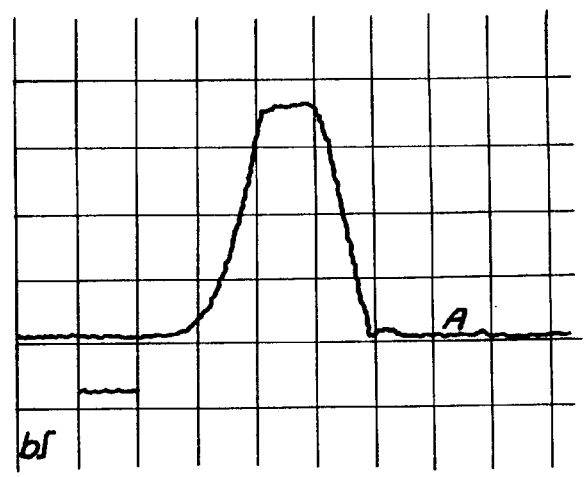
FIG. 8, consisting of FIGS. 8a, 8b and 8c, illustrate position wave forms of a prior art diverter, and two position profiles of the diverter of the present invention.
Figure 8B:
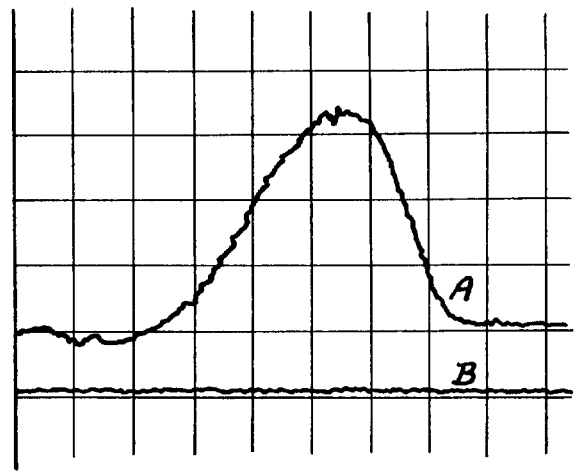
Figure 8C:
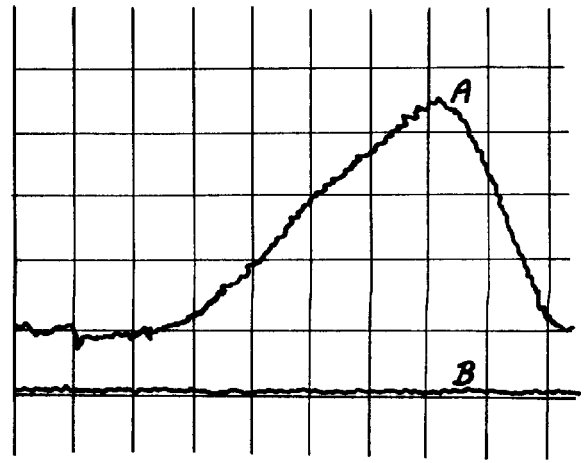

FIGS. 8b and 8c illustrate two exemplary actual position profiles of the diverter of the present invention. The profiles differ in extension slope, though the fairly constant slope of the two profiles is indicative of the substantially constant velocity obtained in each, independent of the magnitude of that velocity. The commanded position profile could be tailored in accordance with the dynamics of the system, if desired, to provide an even more uniform velocity profile. FIG. 8a illustrates a corresponding position profile of a prior art diverter on the same scale as the profiles of FIGS. 8b and 8c. To be sure that the diverter does not stick, the same is driven to a much higher, and relatively uncontrolled, velocity, a lower drive not providing repeatable and reliable operation.

Figure 5:
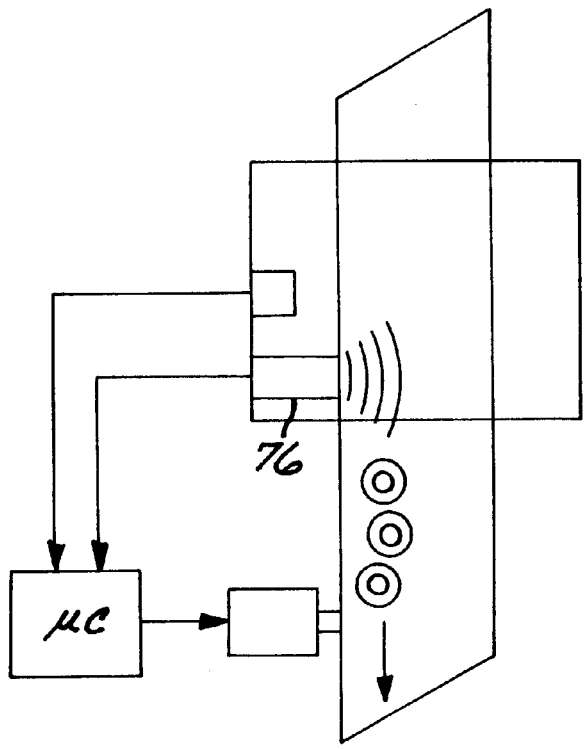
FIG. 5 is a diagram illustrating a system similar to that in FIG. 4, but with an alternate container position sensing system.

Now referring to FIG. 5, a system similar to that in FIG. 4, but with an alternate container position sensing may be seen. In particular, in this embodiment an acoustic proximity sensor 76 is used to both sense the time of closest proximity of each container and further to measure the actual lateral position of the container on the conveyor. Such acoustic sensors are readily commercially available and have the advantage of not being subject to contamination of light source and light sensor windows which could lead to faulty sensing of container position.

Figure 7:
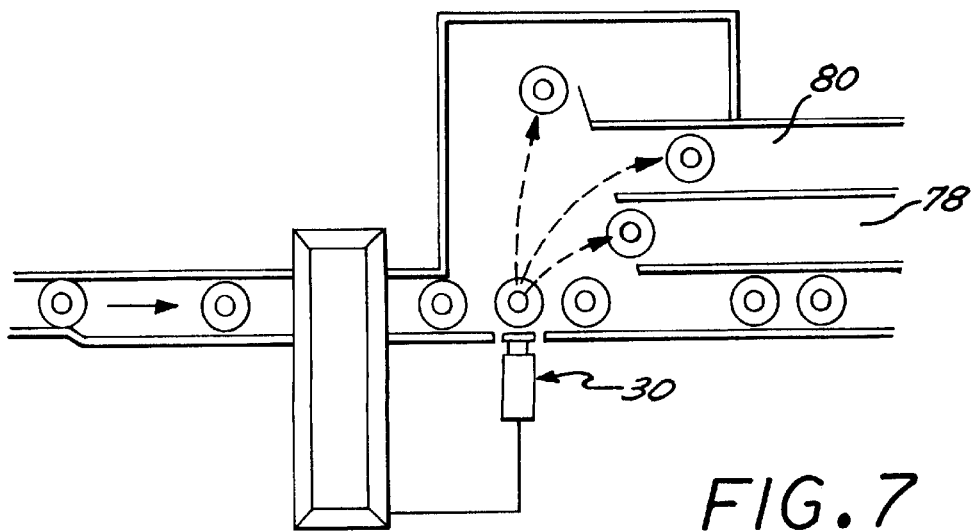
FIG. 7 is a top view of a system utilizing the diverter 30 of the present invention to sort containers.

The ability to control the commanded position profile of the diverter allows the variation of the commanded position profile if and as required without mechanical adjustment of the system, such as by way of example, physical adjustment of a pressure regulator supplying air under pressure to a simple solenoid valve-pneumatic actuator arrangement. Thus, when a line such as a bottling line undergoes a changeover to a second size container, the diverter characteristics such as the commanded profile, or the velocity and extension profiles, may simply be changed under program control. Even the conveyor fences generally determining the container position on the conveyors need not be readjusted, contrary to that required by the prior art, because of the fact that the diverter system of the present invention will itself detect where the container is on the conveyor and act accordingly, as described, to divert the selected containers wherever they may be reasonably positioned on the conveyor. Further, the ability to adjust the diverter operation under software control allows the selection of the commanded position profile of the diverter based on, by way of example, the reason for rejection. By way of specific example, FIG. 7 is a top view of a system utilizing the diverter 30 of the present invention to sort containers based on the reason for rejection. In the specific example shown, containers rejected for a first cause are diverted a modest amount (low velocity diverter motion, perhaps the diverter even following the container all the way to conveyor 78, though a shorter diverter motion is preferable, allowing the containers to continue to their intended destination by the inertia of the container) so as to flow out of the system on conveyor 78, whereas containers rejected for a second cause may be further diverted to flow out of the system on conveyor 80. In this way, the rejected containers may in effect be sorted and selectively directed to equipment or persons tending to the problems therewith. The final positions of the diverted containers on the conveyor may be determined by using several different diverter motions (position profiles or velocity and/or extensions) to propel the containers to specific positions on the conveyor according to the particular velocity and/or extension profiles used, with or without the assistance of strategically placed fences for guiding and stopping the containers in their trajectories across the conveyor.

Obviously of course, the foregoing is but one example of the ability of the present invention to sort objects, such sorting not necessarily depending upon reject conditions for the containers, but also on any other measured or sensed characteristics indicative of the desired sorting. Further, while the system of FIG. 7 in effect sorts on the basis of 1 in 3, sorting on the basis of 1 in 4 or more is also at least theoretically possible. In that regard, in the preferred embodiment, the diverter is "fired" when the container is in a fixed position with respect to the diverter. In for instance a 1 in 4 sorting application, the diverter could be fired slightly early as well as more vigorously to divert containers to a far side outlet conveyor, fired "on time" and a little less vigorously to divert containers to a fence defining the far side of an intermediate outlet conveyor, fired slightly "late" and even less vigorously to divert containers to another fence further downstream for a near side outlet conveyor, or not fired at all to allow the undiverted containers to pass out of the system on the infeed conveyor. Also, while a pneumatic powered diverter is used in the preferred embodiment, other types of actuators may be used, such as, by way of example, hydraulic diverters.

Also, of course, diverter systems in accordance with the present invention may be ganged to provide a higher level of container sorting. By way of specific example, the systems of FIGS. 1 through 6 are based on the selection of 1 in 2 conveyors. However, each outfeed conveyor itself could include an additional 1 in 2 diverter, now giving an overall 1 in 4 capability.

Thus, while the present invention has been disclosed and described herein with reference to certain specific preferred embodiments thereof, it will be understood by those skilled in the art that various changes in form and detail may be made therein without departing from the spirit and scope of the invention.

What is claimed is:

1. A method of diverting containers traveling on a conveyor comprising the steps of:
    (a) placing a pneumatic servo actuator adjacent to the conveyor, the pneumatic servo actuator having an actuator member extendible across part of the conveyor and adapted to contact containers on the conveyor to propel the same across the conveyor;
    (b) for containers to be diverted, extending the pneumatic servo actuator member in a commanded, servo controlled predetermined manner when the container reaches a predetermined position with respect to the actuator member to propel the respective container across the conveyor; and,
    (c) withdrawing the pneumatic actuator member to a position allowing the next container on the conveyor to pass without contacting the actuator member.

2. The method of claim 1 wherein in step (iii), the actuator member is extended in a commanded predetermined manner having a substantially constant velocity of extension.

3. A method of diverting containers traveling on a conveyor comprising the steps of:
    (a) placing a servo actuator adjacent to the conveyor, the servo actuator having an actuator member extendible across part of the conveyor and adapted to contact containers on the conveyor to propel the same across the conveyor;
    (b) sensing the position of the containers on the conveyor as the containers approach the servo actuator;
    (c) commanding the actuator member to extend to a predetermined position with respect to the container to be diverted as that container approaches the servo actuator;
    (d) extending the actuator member in a predetermined manner relative to its commanded predetermined position when the container reaches a predetermined position with respect to the actuator member to propel the respective container across the conveyor; and
    (e) withdrawing the actuator member to a position allowing the next container on the conveyor to pass without contacting the actuator member.

4. The method of claim 1 wherein in step (c), the actuator member is withdrawn to a position allowing a series of containers on the conveyor to pass without contacting the actuator member in readiness for repeating step (b) as a further container to be diverted approaches the servo actuator.

5. The method of claim 3 wherein in step (iii), the actuator member may be extended in any one of a plurality of predetermined manners, relative to its position from step (ii), when the container reaches a predetermined position with respect to the actuator member, each predermined manner to propel the respective container across the conveyor to a respective position across the conveyor.

6. The method of claim 3 wherein in step (iii), the actuator member is extended by a predetermined commanded position profile.

7. The method of claim 6 wherein the predetermined commanded position profile is a triangular commanded position profile.

8. The method of claim 3 wherein in step (iii), the actuator member may be extended in any one of a plurality of commanded position profiles, relative to its position from step (ii), when the container reaches a predetermined position with respect to the actuator member, each respective commanded position profile to propel a container across the conveyor to a different respective position across the conveyor, each respective commanded position profile having the same stroke.

9. The method of claim 3 wherein in step (iii), the actuator member may be extended in any one of a plurality of commanded position profiles, relative to its position from step (ii), when the container reaches a predetermined position with respect to the actuator member, each respective commanded position profile to propel a container across the conveyor to a different respective position across the conveyor, each respective commanded position profile having a different stroke.

10. The method of claim 3 wherein step (a) comprises placing a servo actuator adjacent to the conveyor having an actuator member with an elastic member at the end thereto for contacting containers, and wherein in step (ii), the actuator member is commanded to extend to a predetermined spacing from the container to be diverted as that container approaches the servo actuator.

11. A method of diverting containers traveling on a conveyor comprising the steps of:
 (a) placing a servo actuator adjacent to the conveyor, the servo actuator having an actuator member extendible across part of the conveyor and adapted to contact containers on the conveyor to propel the same across the conveyor;
 (b) for containers to be diverted, extending the servo actuator member in a commanded, servo controlled predetermined manner when the container reaches a predetermined position with respect to the actuator member to propel the respective container across the conveyor; and,
 (c) withdrawing the actuator member to a position allowing a plurality of containers on the conveyor to pass without contacting the actuator member in readiness for repeating step (b) as a further container to be diverted approaches the servo actuator.

12. A method of diverting containers traveling on a conveyor comprising the steps of:
 (a) placing a servo controlled linear actuator adjacent and essentially perpendicular to the conveyor, the linear actuator member extendible across part of the conveyor and the leading surface of the linear actuator member adapted to contact the containers for rejection purposes;
 (b) for containers to be diverted, extending the linear actuator member in a controlled manner having both velocity and extension profiles that are programmable when the container reaches a predetermined position with respect to the linear actuator member to propel the respective container across the conveyor; and
 (c) after extension, withdrawing the linear actuator member to a position allowing the next container on the conveyor to pass without contacting the linear actuator member.

13. A method of diverting containers traveling on a conveyor comprising the steps of:
 (a) placing a pneumatic servo controlled linear actuator adjacent and essentially perpendicular to the conveyor, the linear actuator member extendible across part of the conveyor and the leading surface of the linear actuator member adapted to contact the containers for rejection purposes;
 (b) for containers to be diverted, extending the linear actuator member in a controlled manner when the container reaches a predetermined position with respect to the linear actuator member to propel the respective container across the conveyor; and
 (c) after extension, withdrawing the linear actuator member to a position allowing the next container on the conveyor to pass without contacting the linear actuator member.

14. A method of diverting containers traveling on a conveyor comprising the steps of:
 (a) placing a hydraulic servo controlled linear actuator adjacent and essentially perpendicular to the conveyor, the linear actuator member extendible across part of the conveyor and the leading surface of the linear actuator member adapted to contact the containers for rejection purposes;
 (b) for containers to be diverted, extending the linear actuator member in a controlled manner when the container reaches a predetermined position with respect to the linear actuator member to propel the respective container across the conveyor; and
 (c) after extension, withdrawing the linear actuator member to a position allowing the next container on the conveyor to pass without contacting the linear actuator member.

* * * * *